Aug. 29, 1967 W. M. MINER ETAL 3,338,580

RECORD DRIVING APPARATUS FOR PORTABLE PHONOGRAPH

Filed June 5, 1964 4 Sheets-Sheet 1

INVENTORS

WARREN M. MINER

AKIRA A. YAMASAKI

BY Raymond W. Colton

ATTORNEY

RECORD DRIVING APPARATUS FOR PORTABLE PHONOGRAPH

INVENTORS
WARREN M. MINER
AKIRA A. YAMASAKI
BY Raymond Wheaton
ATTORNEY

INVENTORS
WARREN M. MINER
AKIRA A. YAMASAKI
BY
Raymond W. Cotton
ATTORNEY

INVENTORS
WARREN M. MINER
AKIRA A. YAMASAKI

BY Raymond W Colton
ATTORNEY

United States Patent Office 3,338,580
Patented Aug. 29, 1967

3,338,580
RECORD DRIVING APPARATUS FOR PORTABLE PHONOGRAPH

Warren M. Miner, Brooklyn, and Akira A. Yamasaki, Tappan, N.Y., assignors to The Solocast Company, Stamford, Conn., a corporation of Connecticut Filed June 5, 1964, Ser. No. 372,746
15 Claims. (Cl. 274—39)

This invention relates to a compact portable record player adapted for playing while being carried and in any position of the player and particularly to a drive mechanism for the record.

One feature of the invention is a drive mechanism for the record by which to assure a constant record speed during operation. Another feature is a mechanism for driving the record by driving contact with the periphery of the record. Another feature is a drive in which the driving wheel may be withdrawn from contact with the record when the player is not operating. Another feature is the withdrawal of the motor pulley from the driving wheel when the player is not operating.

One object of the invention is to eliminate any acceleration or deceleration of the record during motion of the player while in operation. This is accomplished by a peripheral drive for the record together with the location of the driving wheel and driving motor on axes spaced from each other and also spaced from the axis of the turntable on which the record is supported. Another feature is the location of the record axis, the driving wheel axis, and the motor axis all in the same plane.

One feature of the invention is a drive for a record in which the record is supported by the turntable and driven by a wheel that contacts the periphery of the record and is in turn driven by a motor engaging an internal peripheral surface of the wheel opposite to the external part of the wheel in engagement with the record. The wheel is mounted for movement toward or away from the record and the motor is mounted so that its drive pulley is movable into and out of contact with the wheel.

Other features and advantages will be apparent from the specification and claims, and from the accompanying drawings which illustrate an embodiment of the invention.

Figures 1, 2:
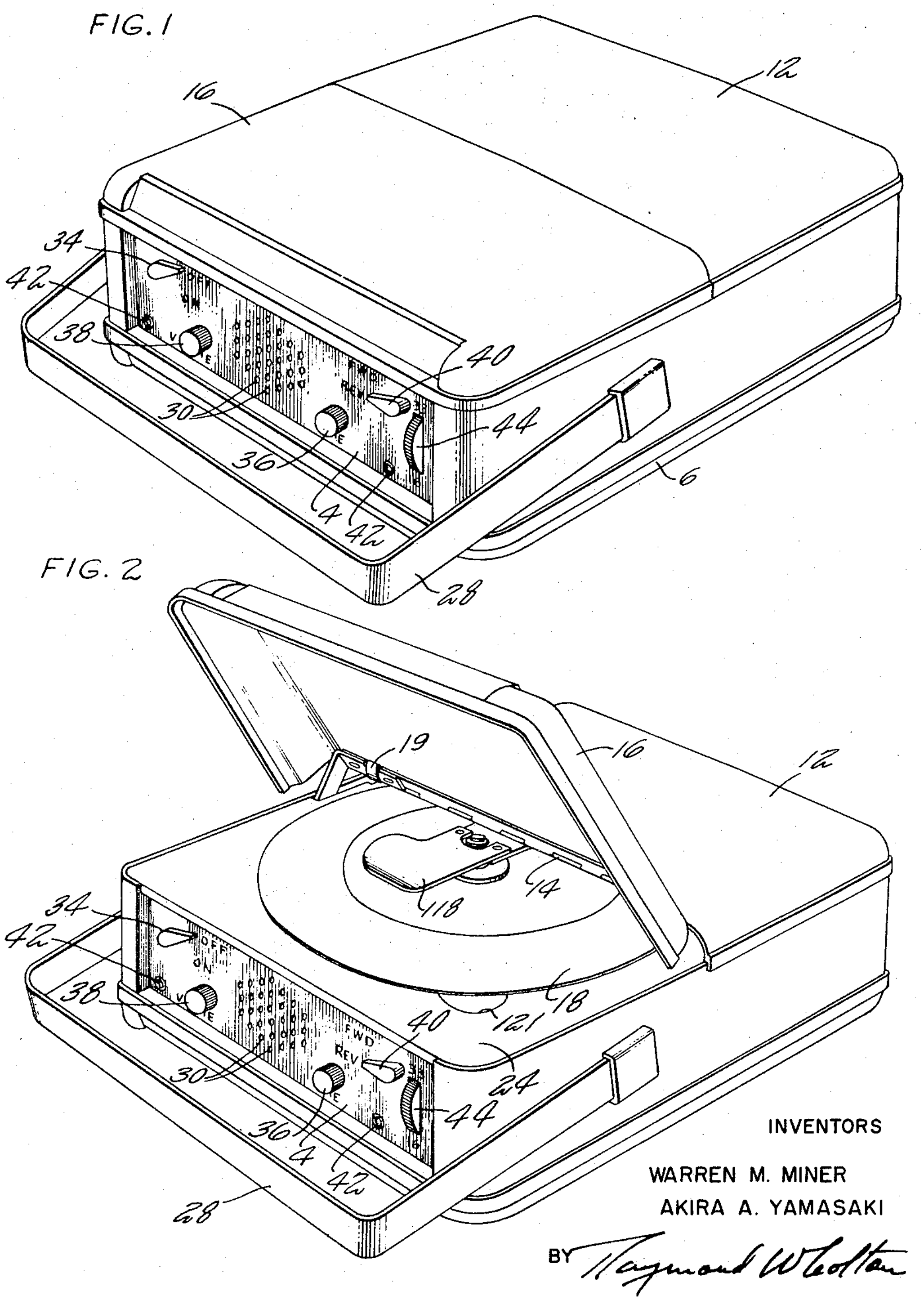
FIG. 1 is a perspective view of the device with the cover closed.
FIG. 2 is a view similar to FIG. 1 with the cover open.

The device includes a chassis having a front panel 4 on which the external controls are mounted. A bottom cover 6 is secured to the bottom plate 8 of the chassis in spaced relation thereto. A top cover plate 12 is attached to the chassis and is hinged as at 14 substantially midway between the front and back to provide, in effect, a movable cover 16 which is opened for the removal of and insertion of a record 18.

Figures 3, 4:
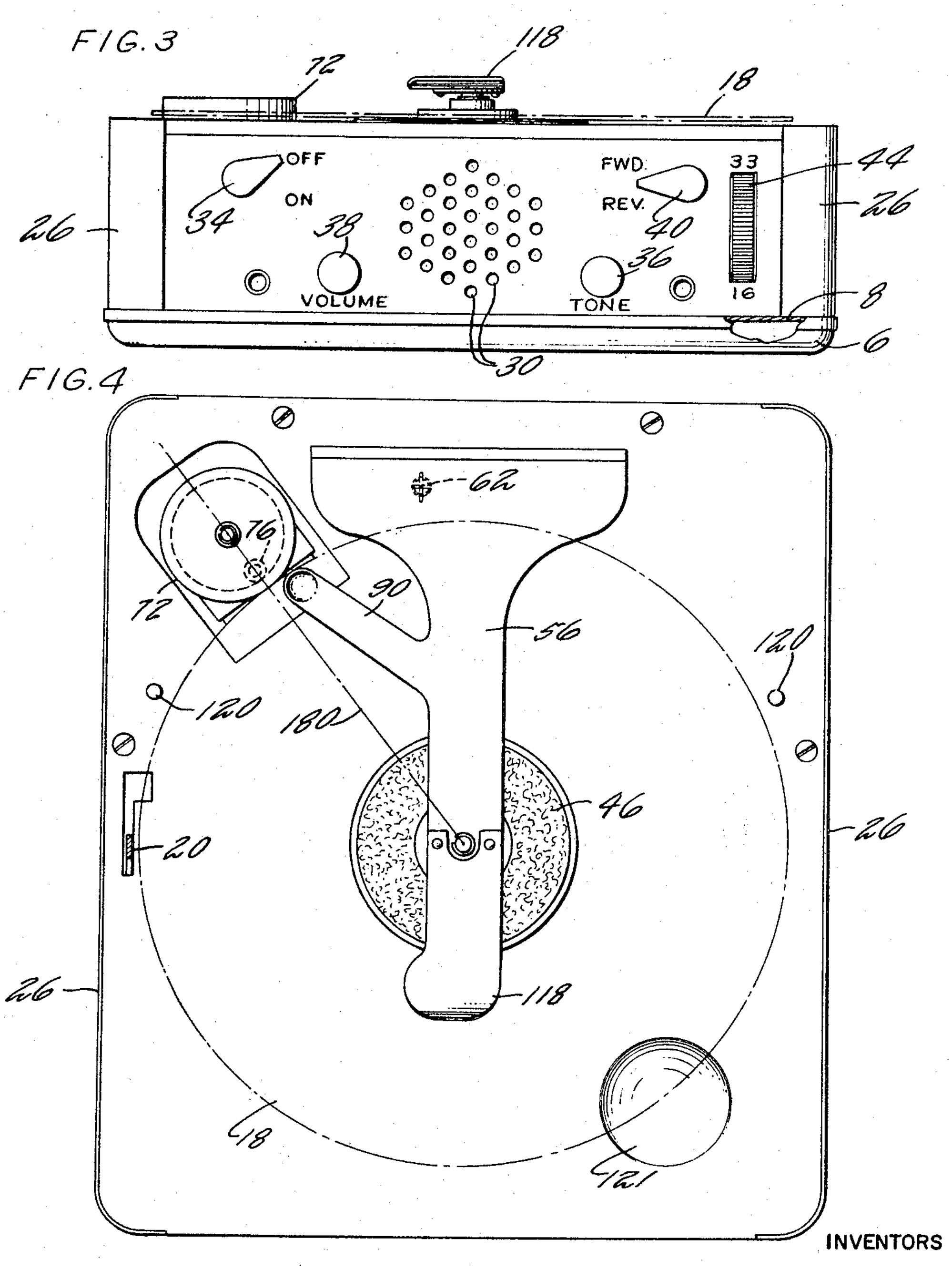
FIG. 3 is a front elevation of the device with the cover removed.
FIG. 4 is a plan view of the chassis with the cover removed.

The chassis includes a top plate 24 to which substantially the entire mechanism is attached and which also carries the front panel 4, as shown, for example, in FIG. 3. The bottom plate 8 of the chassis has side walls 26 and an end wall, not shown, which form enclosures for the mechanism when the bottom plate and top plate are secured in assembled relation.

The control panel 4 has a centrally located grill 30 in back of which is located a loud speaker 32. The panel also carries an on-off control lever 34, a tone control 36, a volume control 38 and a scanning lever 40. Except for the lever 34 the other panel elements form no part of the present invention and will not be further described. A U-shaped handle 28 hinged to the opposite side walls 26 provides a convenient arrangement for carrying the player while in use.

Figure 5:
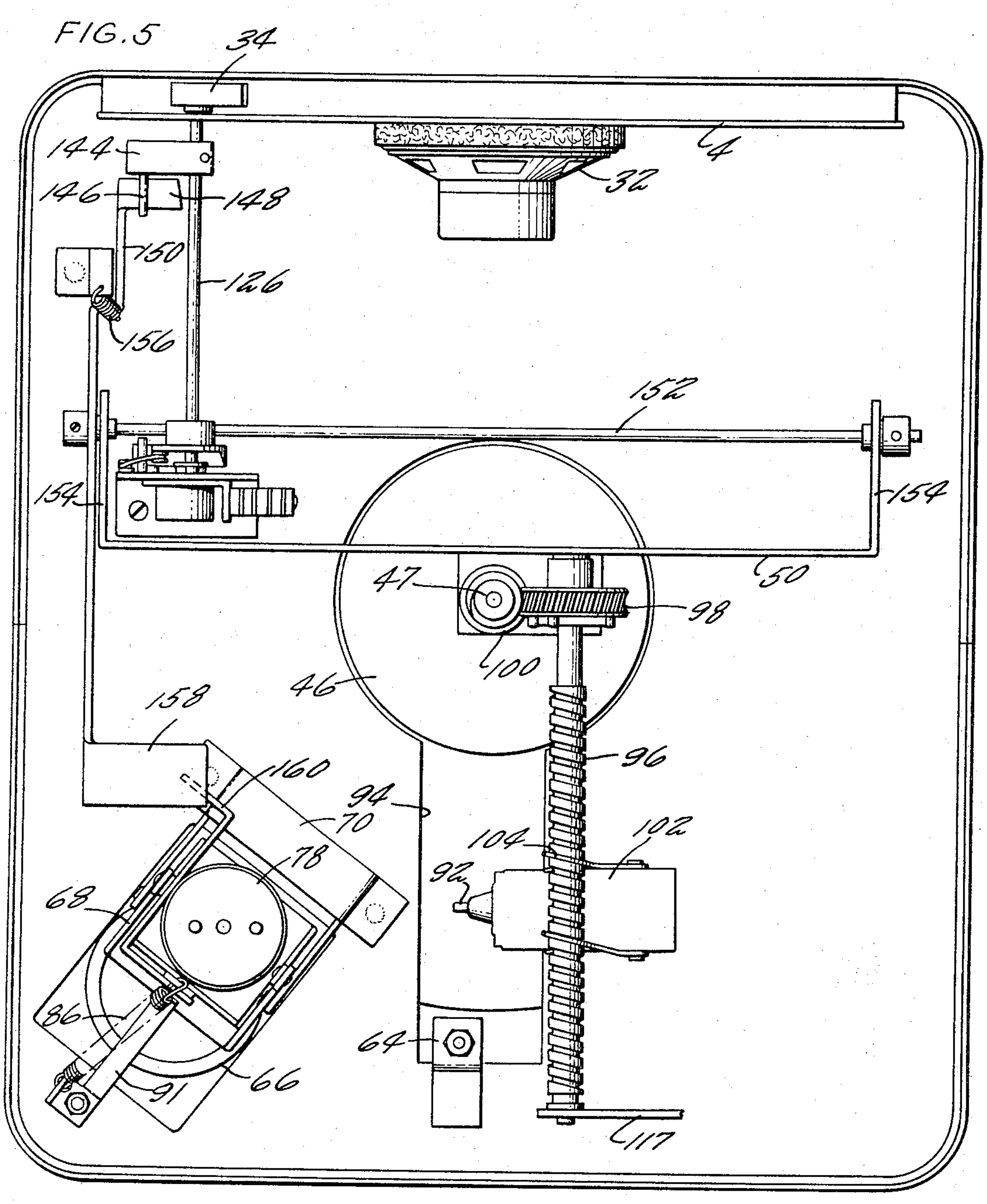
FIG. 5 is an inverted view of the chassis with the bottom plate removed.
Figures 7, 9, 10, 11:
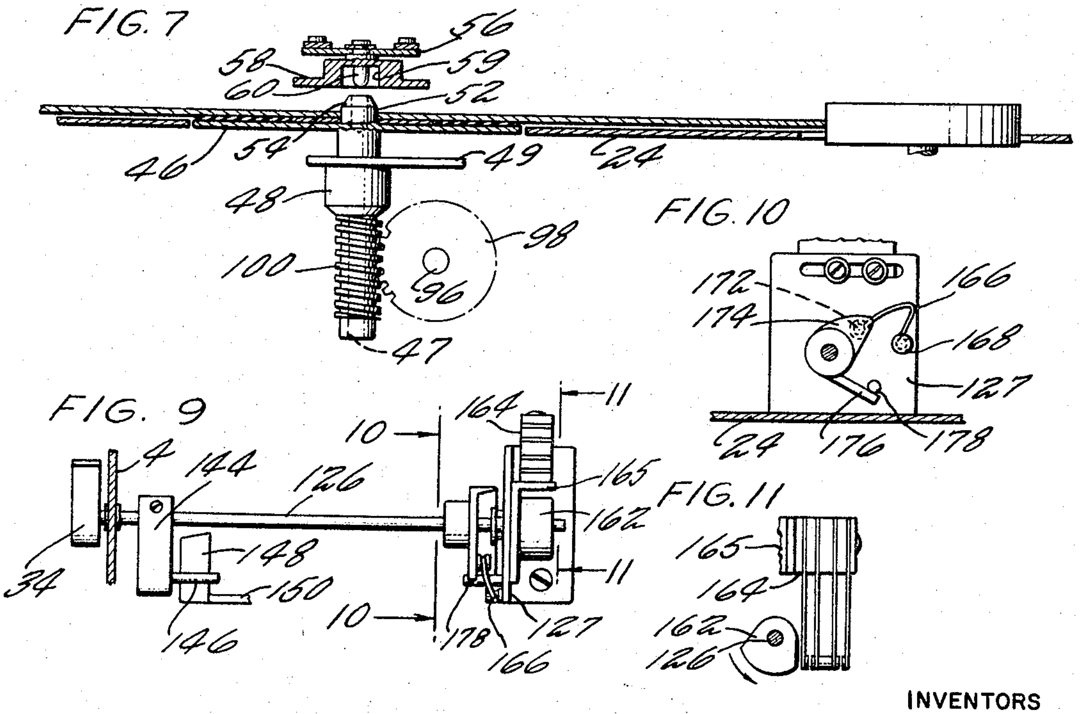
FIG. 7 is a sectional view through the turntable and supporting structure.
FIG. 9 is a fragmentary plan view of the control mechanism.
FIG. 10 is a sectional view on line 10—10 of FIG. 9.
FIG. 11 is a sectional view on line 11—11 of FIG. 9.

Referring now to FIGS. 5 and 7, the record 18 is supported on a turntable 46 mounted in a shaft 47 journalled in a bearing 48 carried by a bracket 49 on the intermediate frame member 50, FIG. 5, of the chassis. The record is supported between the top plate 24 of the chassis and the top cover plate 12 closely adjacent to the top plate and is held in position on the turntable by a central hollow pin 52 extending centrally from the turntable. The upper end of this pin may be conical as at 54 to assist in positioning the record on the turntable. A hinged arm 56, FIG. 4, secured to the top plate 24 carries a hold-down disc 58 that engages the surface of the record opposite to the turntable. The disc has a central recess 59 to receive the pin 52 and has a central projection 60 that fits within the hollow pin 52 thereby forming a bearing for the pin. In this way, the hinged arm 56 serves as an additional support or bearing for the turntable on the side opposite to bearing 48 so that the record is securely held in position within the device with no tilting of the turntable possible. The arm 56 is held in operative position with the hold-down disc engaging the record by a spring 62 extending between the underside of the arm 56 and a bracket 64, FIG. 5, on the chassis.

Figure 6:
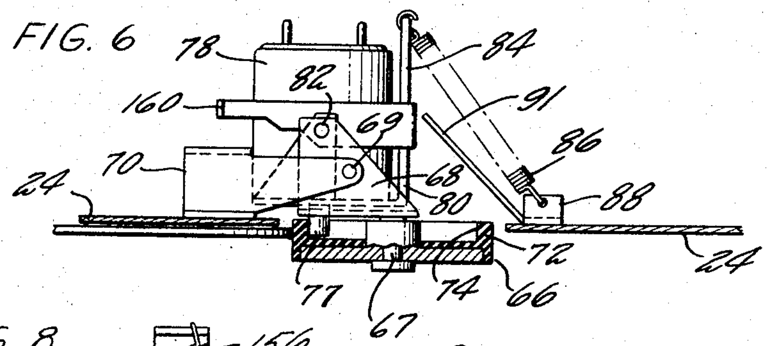
FIG. 6 is a fragmentary side view of the drive mechanism.

The record is driven by a driving pulley or wheel 66, FIG. 6, journalled on a pin 67 secured in a bracket 68. The bracket is pivotally supported as by pins 69 on a fixed bracket 70, the latter being attached to the top plate 24. The wheel 66 has a peripheral flange 72, the outer peripheral surface of which engages with the periphery of the record 18, as will be apparent. The inner peripheral surface 74 of the flange is engaged by a projection of the shaft 77 of a drive motor 78. The motor is mounted on a bracket 80 pivotally mounted as at 82 on the bracket 68. The pivotal mounting 82 for the motor is parallel to and spaced from the pivotal mounting 69 for the bracket 68 and both of these pivotal mountings are parallel to the plane of the record. The axis of the pivotal mounting 82 for the motor 78 intersects the motor axis so that the motor is balanced on this axis, and the axis of the pivotal mounting on pins 69 is substantially on the center of gravity of the motor and driving wheel assembly so that this assembly is substantially in balance. These axes are both in planes substantially parallel to a plane tangential to the record at the point where the wheel engages the record.

The bracket 80 has a projecting arm 84, the free end of which is connected by a spring 86 to a mounting bracket 88 attached to the top plate 24. In this way the spring 86 normally urges the pulley 76 into engagement with the driving wheel 66 and also urges the driving wheel against the periphery of the record. To prevent buckling of the record 18, the hinged arm 56 may have a projecting finger 90 which overlies the periphery of the record adjacent to the point of contact with the driving wheel. A fixed stop 91 on the plate 24 limits the pivotal movement of the motor and wheel in a clockwise direction, FIG. 6, when there is no record on the turntable.

The record is played through a stylus 92, FIG. 5, which engages with the side of the record adjacent to the top plate 24, this side being opposite to the cover plate 12. In effect, this can be considered the underside of the record and the stylus engages the record through a slot 94 in the top plate. The stylus is caused to move radially of the record as the record is rotating through a helically grooved lead screw 96, the latter being rotated, for example, by the rotation of the turntable on which the record is carried.

The lead screw 96, FIGS. 5 and 7, has mounted thereon a worm gear 98 which is driven from a worm 100 on the shaft 47 for the turntable. With this arrangement, the turntable will be rotated as a result of the record being driven and will provide a rotation of the lead screw 96 in proper timed relation to the rotation of the record to traverse the stylus at the appropriate rate to keep the stylus in the record groove.

The stylus is mounted on a carriage 102, which is connected to the helical groove by fingers 104, so that the carriage and stylus are traversed as the lead screw rotates. The lead screw 96 is supported in the intermediate frame member 50 and an end frame member 117.

A record is inserted by opening the top lid 16 and raising the thumb latch 118 forming a unitary extension of the hinged arm 56. The record is then positioned over the conical end of the hollow pin 52 on the turntable, this positioning being assisted by locating pins 120 projecting from the top plate 24. A depression 121 in the corner of the top plate, FIG. 4, assists in holding the record while it is inserted or removed. When the record is in position and the hold-down disc has been placed in contact with the record by the movement of the hinged arm toward the top plate 24, the lid 16 may be closed and the device is ready for operation.

The device is turned on by moving the off-on lever 34 into "on" position, this lever being carried by a rod 126 journalled in the panel 4 and in a support bracket 127 mounted on the top plate.

Moving the control lever 34 to "on" position energizes motor 78 and also reelases the drive mechanism for the record for movement of the drive mechanism into operative position. The rod 126 to which the control lever 34 is secured has an arm 144, FIG. 9, in which a projecting pin 146 is mounted. This pin 146 is in a position to engage with a projection 148 carried on the end of a lever 150, FIG. 8. The lever is mounted for pivotal movement on a cross rod 152 journalled in an end plate 154 on the intermediate frame member 50. A spring 156 holds the projection 148 in contact with the pin 146 and urges the lever in a clockwise direction.

Figure 8:
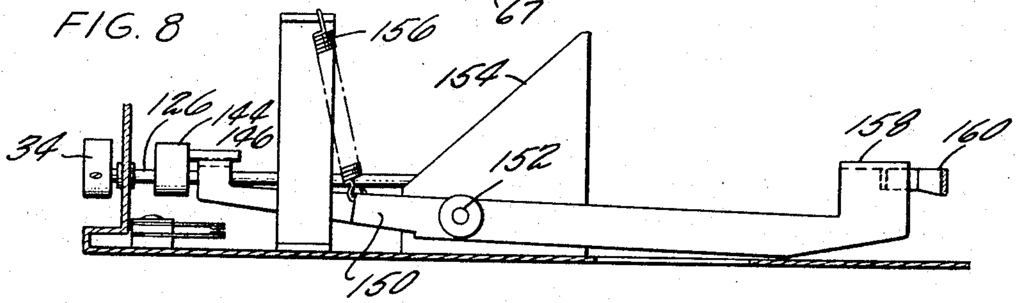
FIG. 8 is a side view of the control mechanism for moving the driving mechanism into inoperative position.

Turning the control lever 34 to "on" position moves the projection 148 downwardly thereby moving the lever 150 against spring 156 in a counterclockwise direction and moving the right-hand end of the lever, as seen in FIG. 8, in an upward direction. This end of the lever carries a lateral tab 158 in a position to engage with a bar 160 located on and attached to the bracket 80 for the driving motor 78. This bar 160 is also secured to the projecting arm 84. Upward movement of the right-hand end of the lever 150 accordingly allows the motor bracket to move clockwise under the influence of the spring 86 and thus bring the driving wheel into engagement with the edge of the record and the motor pulley into contact with the wheel.

The rod 126 carrying the control lever 34 has at the opposite end a cam 162, FIG. 11, in a position to engage a switch 164 by which the motor 78 is energized. Obviously, turning lever 34 to "on" position closes switch 164. Switch 164 is mounted on a plate 165 forming an extension of the bracket 127, FIG. 10.

The control lever is held resiliently in either "on" or "off" position by a spring 166, FIG. 10, extending between a pin 168 on the bracket 127 on the top plate 24 and a pin 172 on an arm 174 mounted on the rod 126. A projecting pin 176 on the arm 174 engages a fixed stop 178 on the bracket 127 in the "off" position of the lever 34.

In operation, when the control lever 34 is turned to "on" position, the lever 150 is moved counterclockwise to close switch 162 and start motor 78. The upward movement of the right-hand end of lever 150 allows the motor 78 to pivot on its axis 82 under the influence of spring 86 to bring the pulley on the motor into engagement with the inner peripheral surface of the wheel flange. The wheel also pivots on the axis 69 of its support bracket until the outer peripheral surface engages the edge of the record. As shown in the dot-dash line 180, FIG. 4, the axes of the wheel, the motor shaft and record turntable are all in the same plane and in operative position are substantially parallel. The axis of rotation of the wheel is necessarily substantially offset from that of the record and the direction of rotation of the wheel is opposite to that of the turntable and record so that any swinging movement of the record player about any axis parallel to these axes which will tend to accelerate either the wheel or record will tend to decelerate the other. If the moments of inertia of the wheel and rotating part of the motor, both of which rotate in the same direction, total to a moment of inertia substantially the same as the turntable and record, the tendency to accelerate the record and turntable both rotating in one direction is almost completely balanced by the tendency to decelerate the wheel and motor. Similarly, a tendency for deceleration of the record and turntable is balanced by the tendency to accelerate the wheel and rotating parts of the motor. Thus the speed of the record should be quite insensitive to motion of the device during playing.

It is to be understood that the invention is not limited to the specific embodiment herein illustrated and described, but may be used in other ways without departure from its spirit as defined by the following claims.

We claim:

1. A record player having a base, a turntable mounted for rotation on the base to support a record, and driving means mounted on the base for rotating the record including a driving motor and motor driven means engageable with the periphery of the record to rotate it, said motor and said driven means being movable about substantially parallel axes spaced from the axes of the motor and driven means for movement relative to the turntable.

2. A record player as in claim 1 in which said motor and said driven means are separately movable about their respective spaced axes.

3. A record player as in claim 1 in which the motor driven means is a flanged pulley having inner and outer peripheral surfaces, the outer surface contacting with the periphery of the record for driving it.

4. A record player having a base, a turntable mounted for rotation on the base to support a record, and driving means mounted on the base for rotating the record including a driving motor and motor driven means engageable with the periphery of the record to rotate it, said motor and said driven means being movable about axes spaced from the axes of the motor and driven means for movement relative to the turntable, said motor driven means being a flanged pulley having inner and outer peripheral surfaces, the outer surface contacting with the periphery of the record for driving it, said driving motor having a driving shaft engageable with the inner peripheral surface of the pulley.

5. A record player as in claim 4 in which a pivoted mounting carries the pulley and a hinged support carries the driving motor and the hinge axes for the pivoted mounting and hinged support are parallel.

6. A record player as in claim 5 in which the mounting is pivotally mounted on the support and the support is pivotally mounted on the base.

7. A record player as in claim 4 in which the turntable axis, the motor axis and the flanged pulley axis are all in the same plane.

8. A record player as in claim 5 in which the turntable axis, the motor axis and the flanged pulley axis are all in the same plane and the axes for the pivoted support and hinged mounting are at right angles to said plane.

9. A record player including a base, a turntable mounted for rotation on said base and adapted to support a record thereon, the record being larger in diameter than the turntable, and driving means mounted on said base in a position to engage the periphery of the record for driving it, said driving means including a driving pulley having an axis of rotation, a support for said pulley hinged on said base about an axis substantially perpendicular to said pulley axis, and spring means for urging the support in a direction to move the pulley into operative position to engage a record on the turntable.

10. A record player including a base, a turntable mounted for rotation on said base and adapted to support a record thereon, the record being larger in diameter than the turntable, and driving means mounted on said base in a position to engage the periphery of the record for driving it, said driving means including a driving pulley, a support hinged on the base on which the driving pulley is mounted for rotation, spring means for urging the support in a direction to move the pulley into operative position to engage a record on the turntable, a hinged mounting carried on said hinged support, a driving motor attached to the hinged mounting, and a member on the driving motor moved into and out of engagement with the driving pulley by movement of said mounting.

11. A record player as in claim 10 in which the driving pulley has a peripheral flange with an inner and an outer peripheral surface, the outer surface being positioned to engage the periphery of a record, the inner surface being positioned to be engaged by the motor shaft.

12. A record player as in claim 10 in which the hinge axes for the mounting and support are parallel to each other and substantially at right angles to the plane of the axes of the motor pulley and driving pulley.

13. A record player having a base, a driven system including a turntable mounted for rotation on the base, and a record on said turntable; a driving system including a motor rotor, and driving means driven by said motor in the same direction as said rotor and engageable with the periphery of the record for driving the record and turntable; the moment of inertia of the driving system being substantially equal to the moment of inertia of the driven system.

14. A record player having a base, a turntable mounted for rotation on the base, a record on said turntable rotatable in the same direction as said turntable, a driving motor having a rotor, driving means driven by said motor in the same direction as said rotor and engageable with the periphery of the record for driving the record and turntable, the moment of inertia of said driving means and said rotor being substantially equal to the moment of inertia of the record and turntable.

15. A record player as in claim 13 in which the rotor and driving means are pivotally mounted on axes parallel to and spaced from the record and turntable axis and said rotor and driving means rotate in the opposite direction from that of said record and turntable.

References Cited

UNITED STATES PATENTS

| | | | |
|---|---|---|---|
| 2,262,731 | 11/1941 | Gruber | 274—9 |
| 2,735,683 | 2/1956 | Klein | 274—39 X |
| 3,249,360 | 5/1966 | Beer | 247—9 |

NORTON ANSHER, *Primary Examiner.*

C. B. PRICE, *Examiner.*